(12) United States Patent
Matti

(10) Patent No.: US 7,559,018 B2
(45) Date of Patent: Jul. 7, 2009

(54) COMPUTER-IMPLEMENTED SYSTEM AND METHOD FOR DATA COLLECTION

(75) Inventor: Michael C. Matti, Durham, NC (US)

(73) Assignee: SAS Institute Inc., Cary, NC (US)

( * ) Notice: Subject to any disclaimer, the term of this patent is extended or adjusted under 35 U.S.C. 154(b) by 1146 days.

(21) Appl. No.: 10/658,946

(22) Filed: Sep. 10, 2003

(65) Prior Publication Data

US 2005/0055438 A1    Mar. 10, 2005

(51) Int. Cl.
*G06N 3/00* (2006.01)
(52) U.S. Cl. ....................................... 715/234
(58) Field of Classification Search ............... 715/223, 715/224, 234, 243, 254
See application file for complete search history.

(56) References Cited

U.S. PATENT DOCUMENTS

| | | | |
|---|---|---|---|
| 5,987,231 A * | 11/1999 | Fong et al. ................. 358/1.18 |
| 6,167,523 A * | 12/2000 | Strong ......................... 726/21 |
| 6,236,975 B1 * | 5/2001 | Boe et al. ....................... 705/7 |
| 6,934,913 B2 * | 8/2005 | Le et al. ...................... 715/750 |
| 2002/0065641 A1 * | 5/2002 | Ramsey ....................... 703/17 |
| 2003/0033193 A1 | 2/2003 | Holloway et al. |
| 2003/0126555 A1 * | 7/2003 | Aggarwal et al. ........... 715/505 |
| 2003/0177140 A1 * | 9/2003 | Debard et al. ............ 707/104.1 |
| 2003/0188262 A1 * | 10/2003 | Maxwell et al. ............. 715/507 |
| 2004/0034554 A1 * | 2/2004 | Shirley et al. .................. 705/7 |
| 2005/0086587 A1 * | 4/2005 | Balz ........................... 715/505 |

* cited by examiner

*Primary Examiner*—Stephen S Hong
*Assistant Examiner*—Kyle Stork
(74) *Attorney, Agent, or Firm*—Jones Day

(57) ABSTRACT

Computer-implemented system and method for assisting a user with the completion of online forms, by providing form modification based on input by the user. Certain form modifications are handled by computer instructions executing on the user's computer, and not by the server that provided the form to the user's computer.

70 Claims, 15 Drawing Sheets

| | 1 |
|---|---|
| ✓ | Which best describes this building?<br>*Include all apartments, flats, etc., even if vacant.*<br>○ A mobile home<br>● A one-family house detached from any other house<br>○ A one-family house attached to one or more houses<br>○ A building with 2 apartments<br>○ A building with 3 or 4 apartments<br>○ A building with 5 to 9 apartments<br>○ A building with 10 to 19 apartments<br>○ A building with 20 to 49 apartments<br>○ A building with 50 or more apartments<br>○ Boat, RV, van, etc. |

| | 1.1 |
|---|---|
| ✓ | How many acres is this house or mobile home on? ⟵322<br>● Less than 1 acre<br>○ 1 to 9.9 acres<br>○ 10 or more acres |

| | 1.2 |
|---|---|
| ✓ | IN THE PAST 12 MONTHS, what were the actual sales of all agricultural products from this property? ⟵324<br>● None<br>○ $1 to $999<br>○ $1,000 to $2,499<br>○ $2,500 to $4,999<br>○ $5,000 to $9,999<br>○ $10,000 or more |

| | 1.3 |
|---|---|
| ✓ | Is there a business (such as a store or barber shop) or a medical office on this property? ⟵326<br>○ Yes<br>● No |

*Fig. 9*

COMPUTER-IMPLEMENTED SYSTEM AND METHOD FOR DATA COLLECTION

TECHNICAL FIELD

The present invention relates generally to computer-implemented data collection systems and methods and more particularly to computer-implemented data collection user interfaces.

BACKGROUND

Data collection remains a persistent problem in the pursuit of data quality. Very often, the input of information by individual respondents is achieved through the use of a form. Printed forms have been in use for many years, but remain notoriously error-prone and confusing. The introduction of online, web-based data collection instruments has not led to improvements in form design; instead, the limitations of print forms have been faithfully reproduced, despite the possibilities of programmatic assistance.

FIG. 1 illustrates just some of the difficulties a user encounters when dealing with typical web-based forms. With reference to FIG. 1, a list of options 30 from a web-based form 32 is shown. The selected radio button 34 is difficult to see, due at least in part to the relatively small size of the selection area (typically a button or a box). Selection 34 can also be difficult to locate if the user wishes to later revisit the response provided for the list of options 30. The user may find that selection 34 becomes lost within a myriad of other options (36, 38, 40, 42, 44, 46) and other interface items 50 that appear on the form 32.

As another example, when the completion of certain items depends upon earlier selections, users are typically instructed to ignore irrelevant items and jump to an arbitrary point. This makes it difficult for the user to keep track of required items. Furthermore, if the user skips an item, intending to return to it later, it is difficult to pick out this incomplete item from the deliberately ignored irrelevant items. Also, if data validation is performed at all, it occurs after the web-based form submission. This results in the user being confronted with an alert box and instructions to 1) return to the form, 2) locate the missing items, 3) complete them, and 4) attempt to submit once again. Thus in light of these and other problems, the typical web-based data collection instrument, like its printed predecessors, presents the user with a slow, painstaking, and error-prone process.

SUMMARY

In accordance with the teachings provided herein, a computer-implemented system and method are provided for assisting a user with the completion of online forms, by providing form modification based on input by the user. Certain form modifications are handled by computer instructions executing on the user's computer, and not by the server that provided the form to the user's computer.

BRIEF DESCRIPTION OF THE DRAWINGS

FIGS. 7-9 are graphical user interfaces illustrating item dependencies;

DETAILED DESCRIPTION

Figure 1:
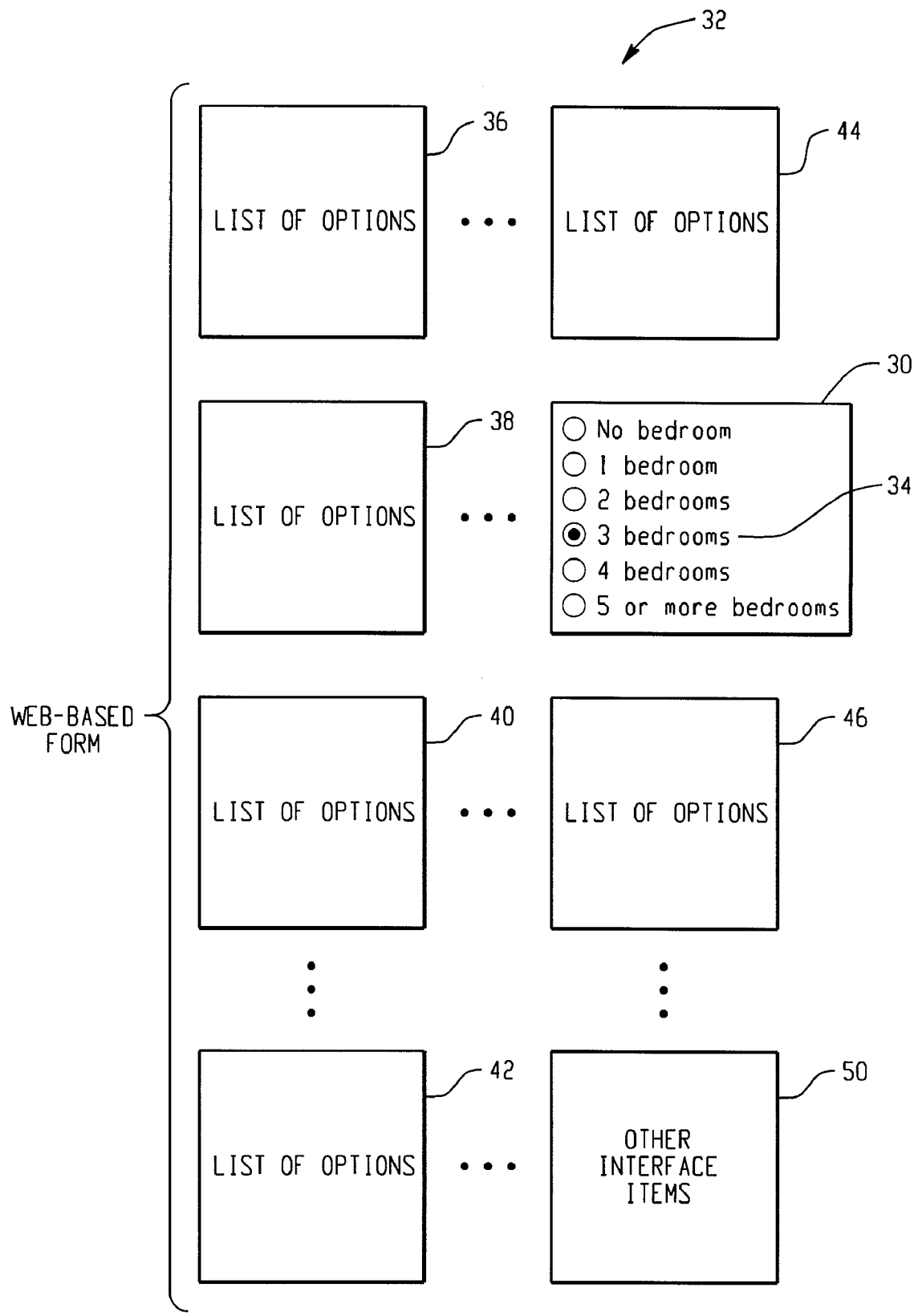
FIG. 1 is a graphical user interface depicting a prior art approach to displaying selections to a user.
Figure 2:
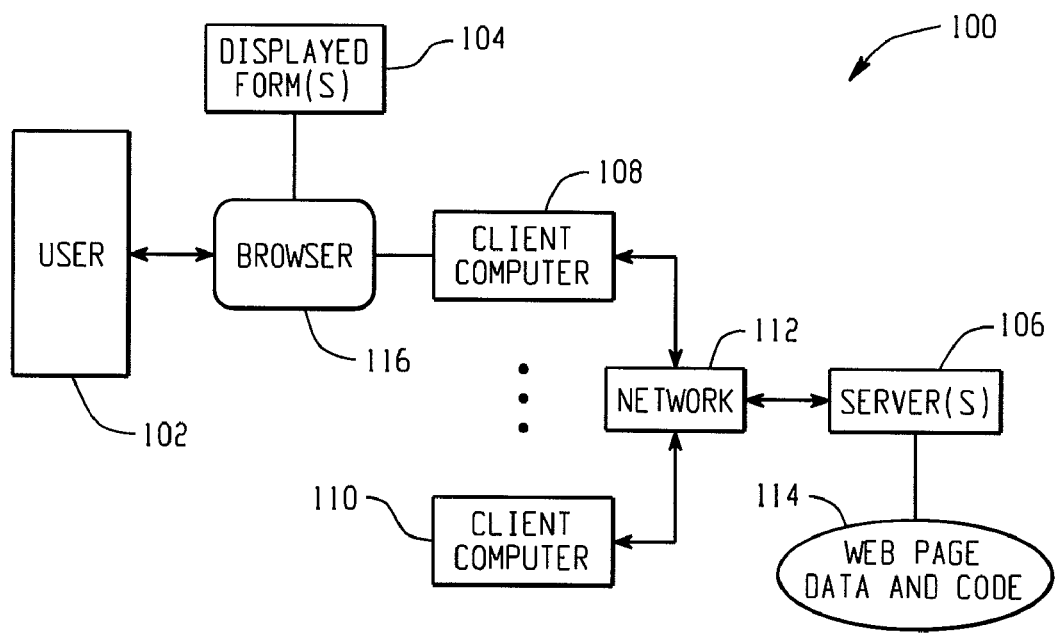
FIG. 2 is a block diagram depicting software and computer components utilized in displaying selections to a user.

FIG. 2 depicts a computer-implemented system 100 for assisting users (e.g., 102) with the completion of online forms (e.g., 104). One or more server computers 106 handle requests from client computers (108, 110) for web page content. The servers 106 receive the requests over a network 112, such as an intranet network, Internet network, local area network (LAN), wide area network (WAN), wireless network, networks accessible over phone lines, etc. The servers 106 contain web page data and code 114 which a client computer's browser 116 can use to display a form 104 to a user 102.

The form 104 can be any online type of form, including those that contain long or complex forms. The form 104 may be directed to gathering data from any field, such as medical, insurance, technical, consumer feedback data, etc. The form 104 may consume a relatively small portion of the user interface or may be strewn over multiple screens wherein the user may have to activate a "next screen" or "continue" button in order to complete the form.

Figure 3:
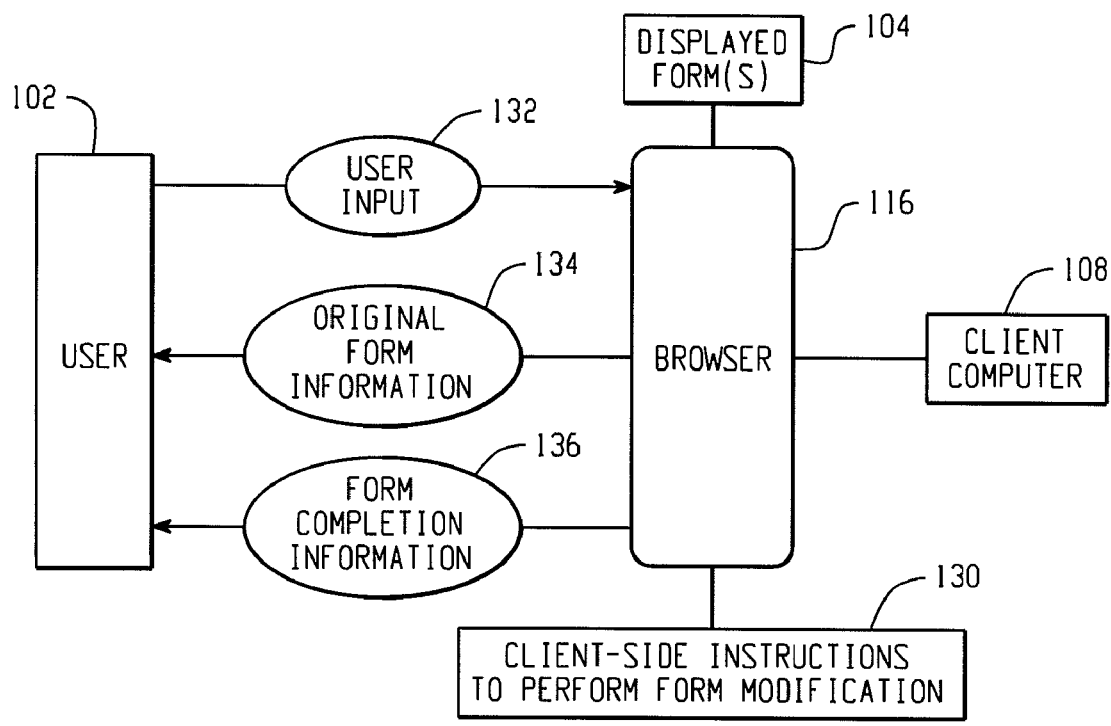
FIG. 3 is a block diagram depicting client-side computer instructions for use in displaying selections to a user.

The system 100 provides real-time (or near-realtime) self-modification of the form 104 based upon input by the user 102. Modifications are handled (at least in part) by the client's browser 116 and not by the server 106 that delivers and accepts the form's data from the client computer 108. This is illustrated in FIG. 3 wherein the client's browser 116 uses client-side instructions 130 to modify a form 104. The client-side instructions 130 analyze the user input 132 and if appropriate, the client-side instructions 130 modify the form's display. The form's display can be modified in a number of ways such that the user is not only presented with information 134 contained on the form 104 originally displayed to the user 102, but also may provide information 136 regarding form completion.

Figure 4:
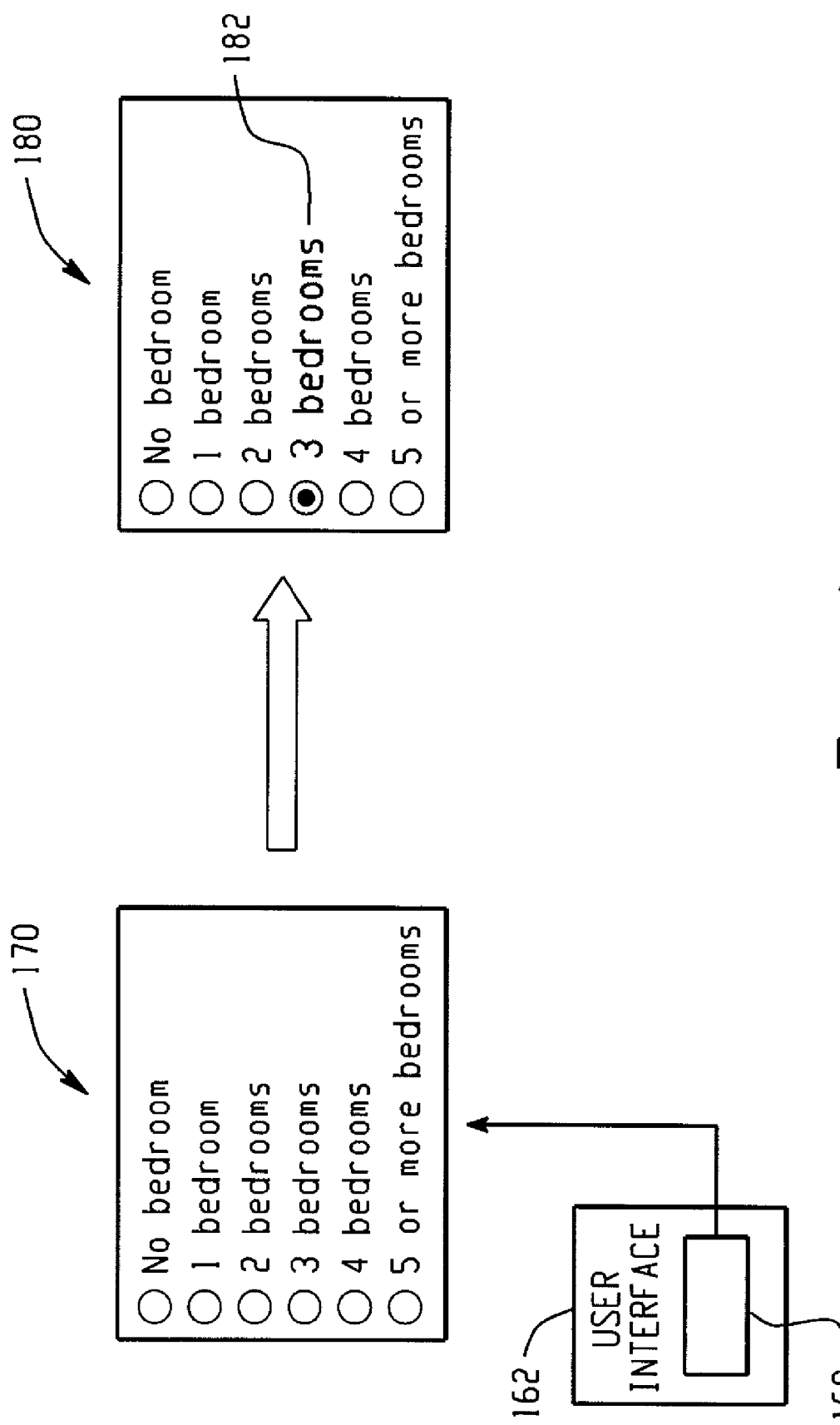
FIG. 4 is a graphical user interface illustrating a highlighting operation with respect to a selection.

For example, the client-side instructions 130 may modify the form 104 in order to highlight a selection made by the user 102. FIG. 4 shows a portion 160 of a form displayed on a user interface 162 wherein a selection becomes highlighted. In this example, the form's portion 160 contains a list of options 170 made available for selection by the user. The list of options is shown at 180 after the user has made a selection. By boldfacing, colorizing, inserting a border, or otherwise highlighting the selection 182, users can more easily see and verify their choices. This is useful in many situations, such as when the user is reviewing a long list of selections.

Figure 5:
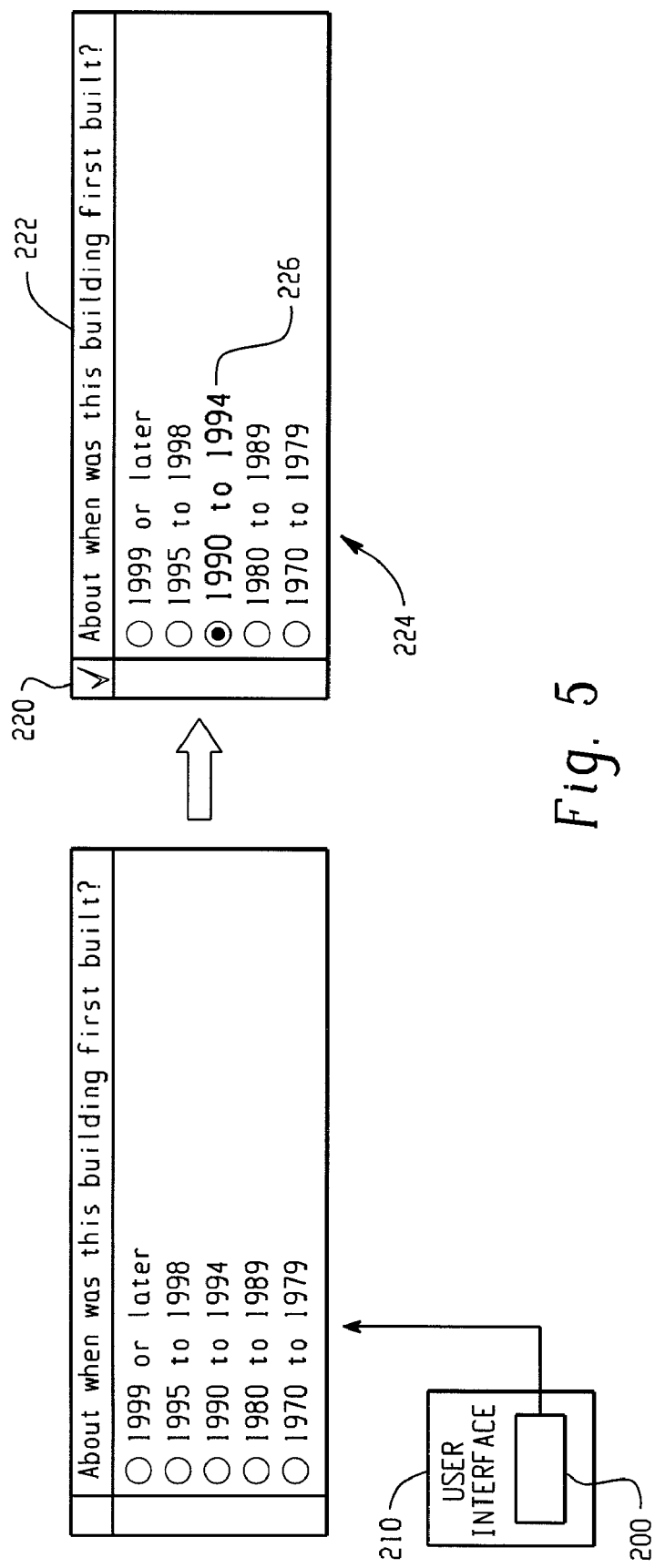
FIG. 5 is a graphical user interface illustrating identification of completed form items.

The client-side instructions may perform other form completion-related operations, such as the operation shown in FIG. 5. With reference to FIG. 5, client-side instructions may indicate the degree of completeness of a data item from a form 200 that is displayed on a user interface 210. In this example, a check mark 220 is inserted into the header (question stem) 222 of a completed item 224 in order to assist users in differentiating between completed and incomplete items. Item 224 has been completed because the user has made selection 226. Other indications, such as a small icon, or similar visual confirmation may be inserted into the header of each completed item in order to assist users in identifying incomplete items. This enables fast and accurate validation by the user, who does not need to examine each question's response field to determine if it has been answered.

It should be understood that the different operations of the client-side instructions disclosed herein may be used together or used separately due to each of the operations contributing significantly different and valuable information to the user.

Figure 6:
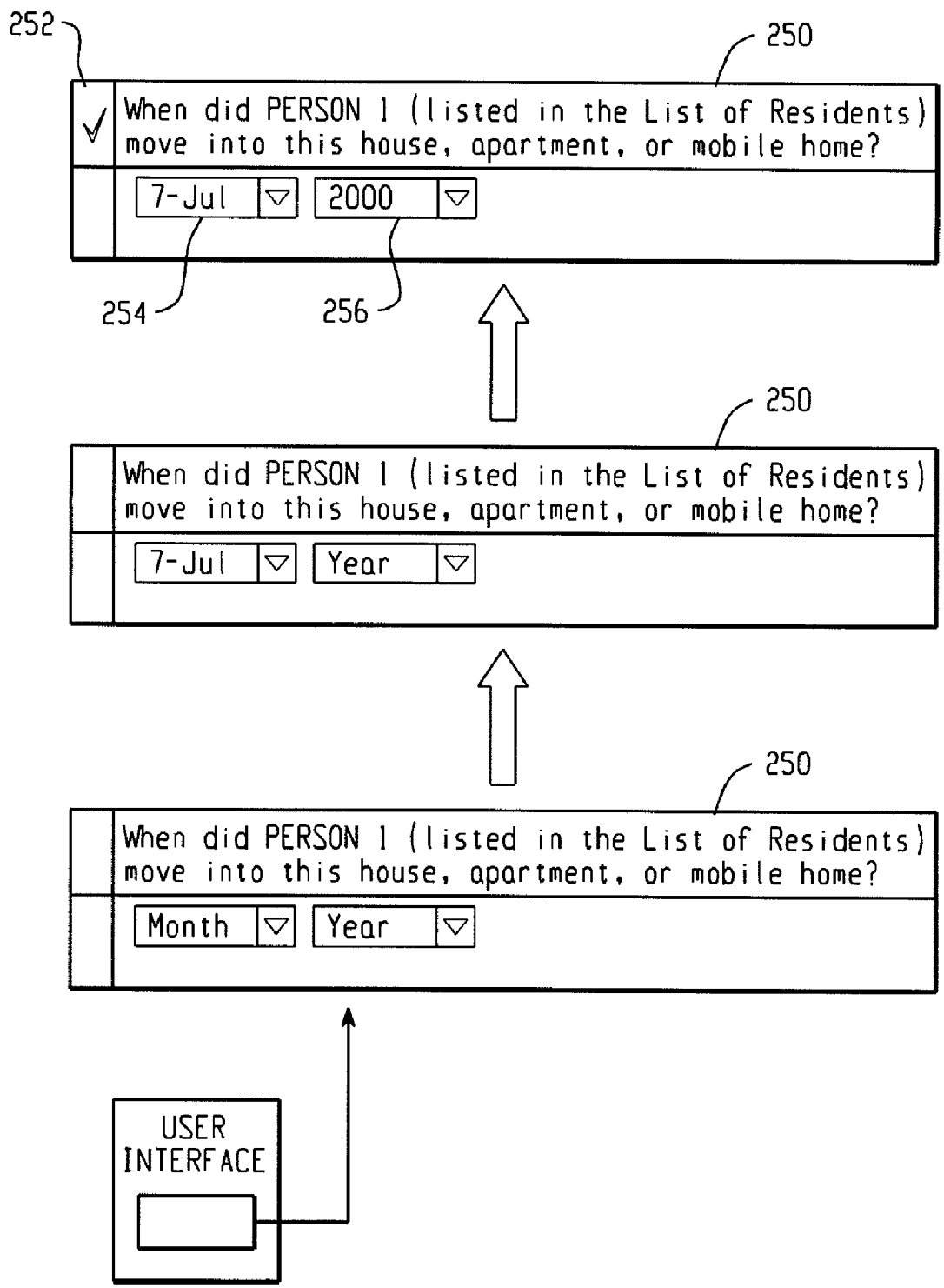
FIG. 6 is a graphical user interface illustrating handling multi-part questions.

The client-side instructions may provide visual assistance to the user in dealing with multi-part questions on a form. A multi-part question 250 is shown in FIG. 6. The multi-part question 250 in this example requires the user to input a month as well as a year. The multi-part question 250 is considered answered and receives a confirmation mark 252 only after all constituent parts (e.g., month 254 and year 256) are completed. Deselecting one of these parts removes the check mark 252 from the header.

Complex forms often create dependencies (e.g., secondary items that require a response only if a preceding, primary item received a specific response). If all items are displayed linearly, as is usually done, this sort of dependency is managed by textual editorial instructions to skip the irrelevant items. Users then navigate through the form to a specified, arbitrary resumption point, increasing the likelihood of missing a required item.

If it is desired to avoid this situation, the client-side instructions can keep dependent items hidden until triggered by a response to the parent item. The dependencies then appear as a subset of the parent, and are hidden once again if a selection is made that renders the dependencies irrelevant.

It is noted that some options in a list of options may have dependencies while other options may not. In the example shown in FIG. 7, a list of options 300 is directed to a question of what best describes a building in which a user might be interested. In this example, the list of options 300 is the first question presented in the form. The ordinal value of the list of options 300 is shown on the form at 310.

For this list of options 300, there are no dependencies associated with the apartment buildings option 302 on the user interface 304. If the user selects this option, then the item is completed with a single click. As described above, this indication is provided through a check mark symbol 306.

However, if the user selected option 320 from list 300 as shown in FIG. 8, then selection of this option 320 reveals dependencies 322, 324, 326 on the form. Option 320 is directed to a one-family house detached from any other house option. The dependent items (322, 324, 326) constitute a secondary set of questions on acreage and usage. They appear as a subset within the primary item, and the primary item is not considered completed until the dependent items (322, 324, 326) are completed by the user.

As shown in FIG. 9, once the dependent questions are completed as shown by indicators (340, 342, 244), the primary item is finally considered completed and is marked as such at 350.

Figure 10:
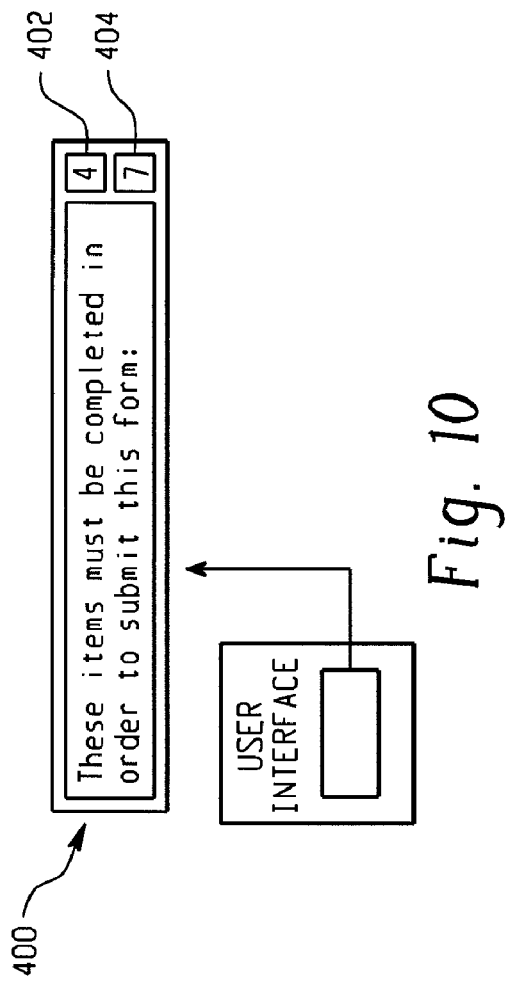
FIG. 10 is a graphical user interface illustrating a reminder box.

Still further to assist with the completion of required items, the client-side instructions could include a reminder that is displayed on the form (such as at the bottom of the form) that lists (e.g., by number, brief description, etc.) the required and incomplete items. FIG. 10 provides an example. With reference to FIG. 10, reminder box 400 shows that items numbered 4 and 7 (not shown) still need to be completed before the form can be submitted. A box may employ different ways to display reminder information. As an illustration, when a form is first loaded in the client browser, links to all required items could be displayed in the reminder box. As required items are completed, their links are removed from the reminder list; if a deselection action renders an item incomplete, it is automatically returned to the reminder list.

Figure 11:
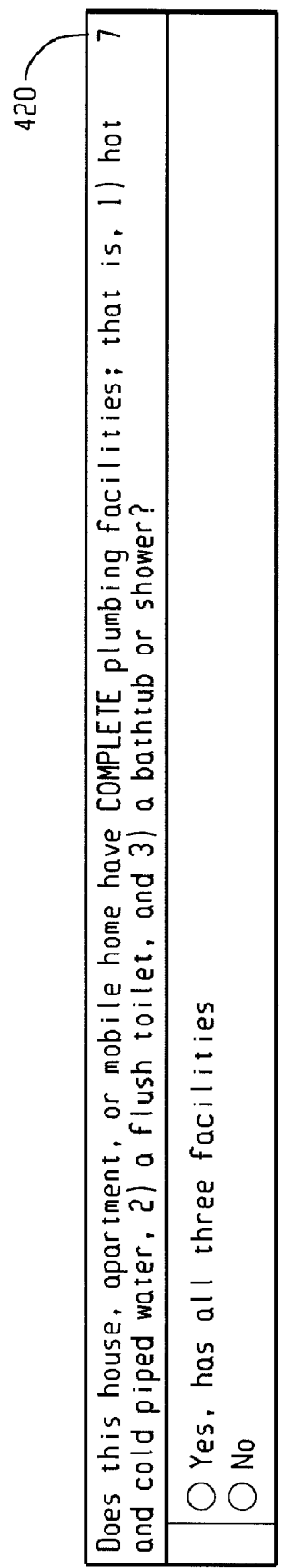
FIG. 11 is a graphical user interface illustrating accessing an incomplete item.

The item identifiers (e.g., numbers, brief descriptions, etc.) are hyperlinks (e.g., 402, 404) back to their location in the form, so that users can immediately find them. Clicking a reminder link (e.g., 402, 404) causes the browser to jump to that location and highlights the item with a change of color or similar cue in the header. For example, if a user clicks on item 7 (shown at 404), then the form presents item 7 to the user for completion. This is shown in FIG. 11. With reference to FIG. 11, the ID number (shown at 420) within this header is changed to red, to aid in its identification as an incomplete item. (The color of a completed item number in this example is green.)

It should be understood that the reminder box could keep track of the degree of completion of the overall form. For example, if the user has completed ten out of twenty questions contained on the form, then the reminder box can indicate that 50% of the questions have been answered. Also, the reminder box can be placed in a separate frame so that the reminder box remains visible while the user scrolls through the form's question.

Figure 12:
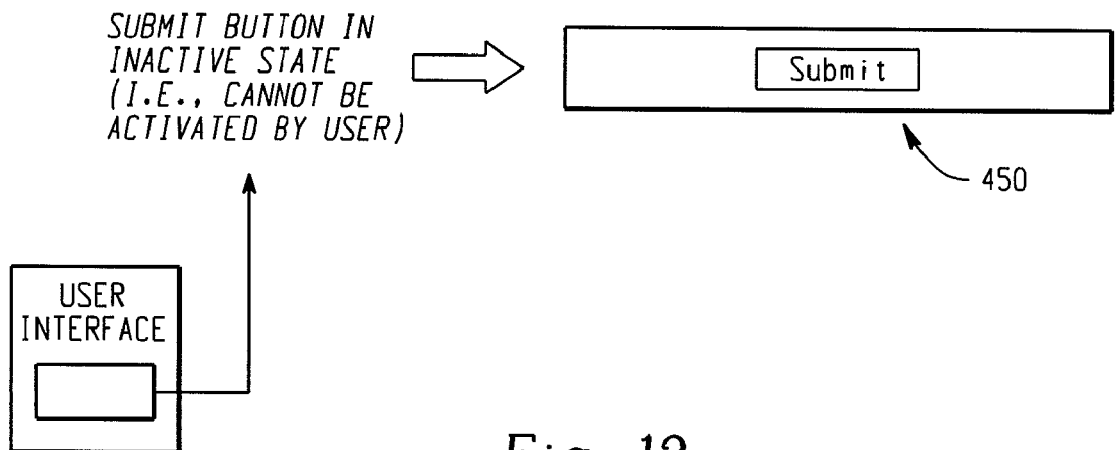
FIG. 12 is a graphical user interface illustrating handling form submission.

In order to prevent submission of an incomplete form, the client-side instructions may keep the submit mechanism inactive until all of the form's required items have been completed. A form's submit button can be completely hidden until form completion. It can be replaced by text that explains it will appear once the form is completed; or can be visible but grayed-out and non-functional until completion. As shown in FIG. 12, when all required items have been completed, the submit mechanism 450 is exposed and the form can be sent for processing to the server. If a required item is rendered incomplete by deselection, the submit button 450 again is suppressed.

Figure 13:
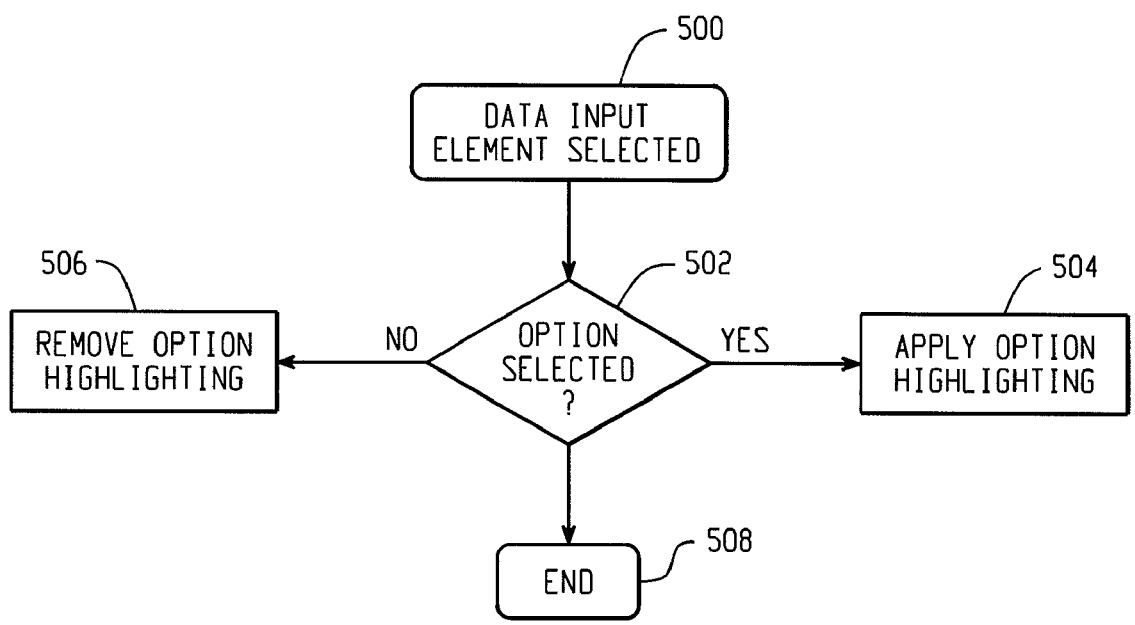
FIG. 13 is a flow chart depicting an example highlighting selection operation.

The client-side instructions may perform one or more of the aforementioned operations in order to communicate form-related information to the user. FIG. 13 depicts an example highlighting selection operation. At step 500, a user has selected on a form a data input element. Decision step 502 examines whether an option within the data input element has been selected. If it has, then step 504 applies highlighting to the selected option. If not, then highlighting is removed or not applied at step 506. Processing at least for this iteration terminates at end block 508.

Figure 14:
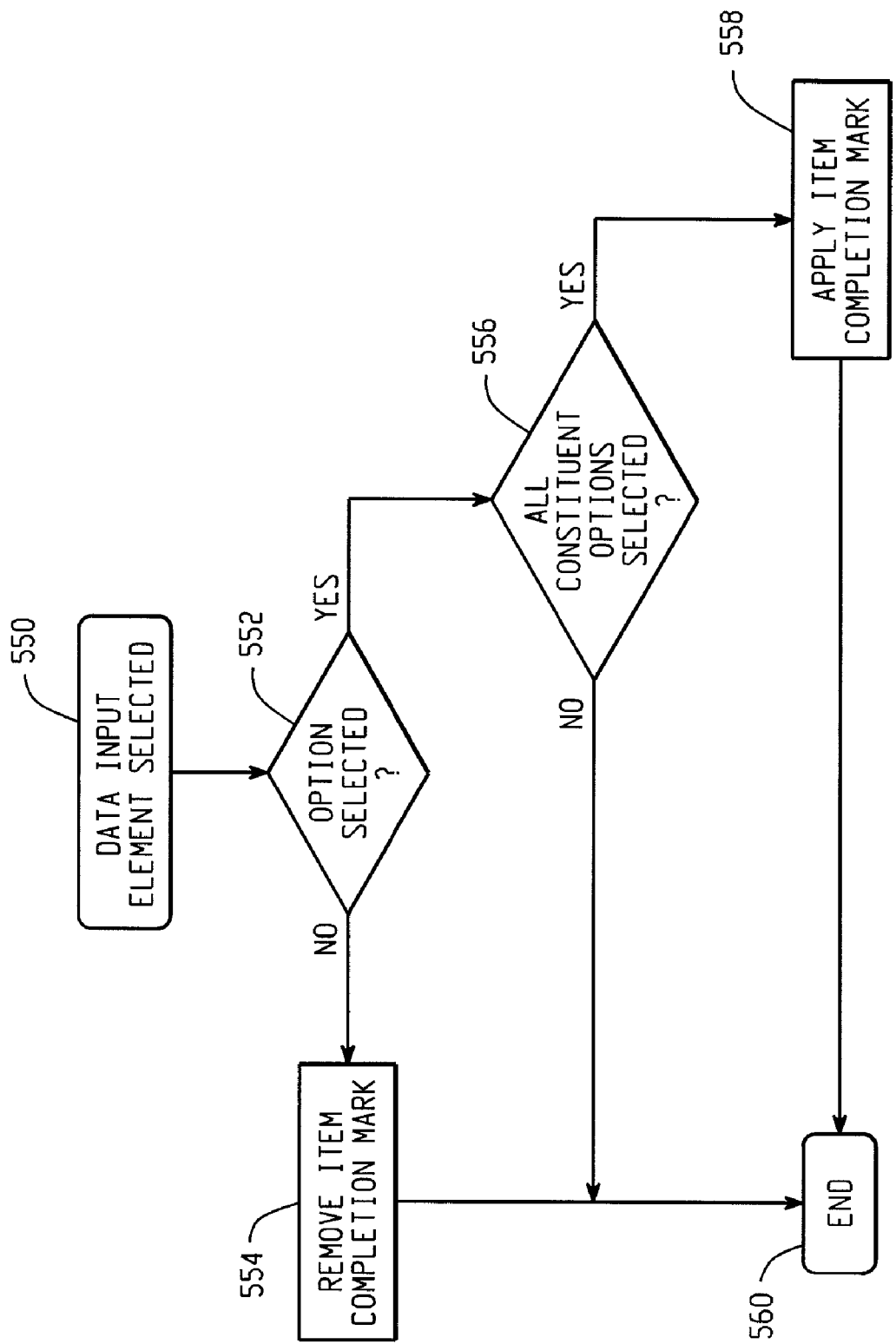
FIG. 14 is a flow chart depicting an example item marking operation.

FIG. 14 is a flow chart illustrating handling item completion. At step 550, a user has selected on a form a data input element. Decision step 552 examines whether an option within the data input element has been selected. If it has, then decision step 556 examines whether all constituent options have been selected. If not all constituent options have been selected as determined by decision step 556, then item completion processing ends at least for this iteration at end block 560. If all constituent options have been selected, then step 558 applies an item completion mark with respect to the selected data input element before processing ends at end block 560.

With reference back to decision step 552, if an option has not been selected, then processing continues at step 554. At step 554, the item completion mark is removed (or not applied). Processing ends at end block 560.

Figure 15:
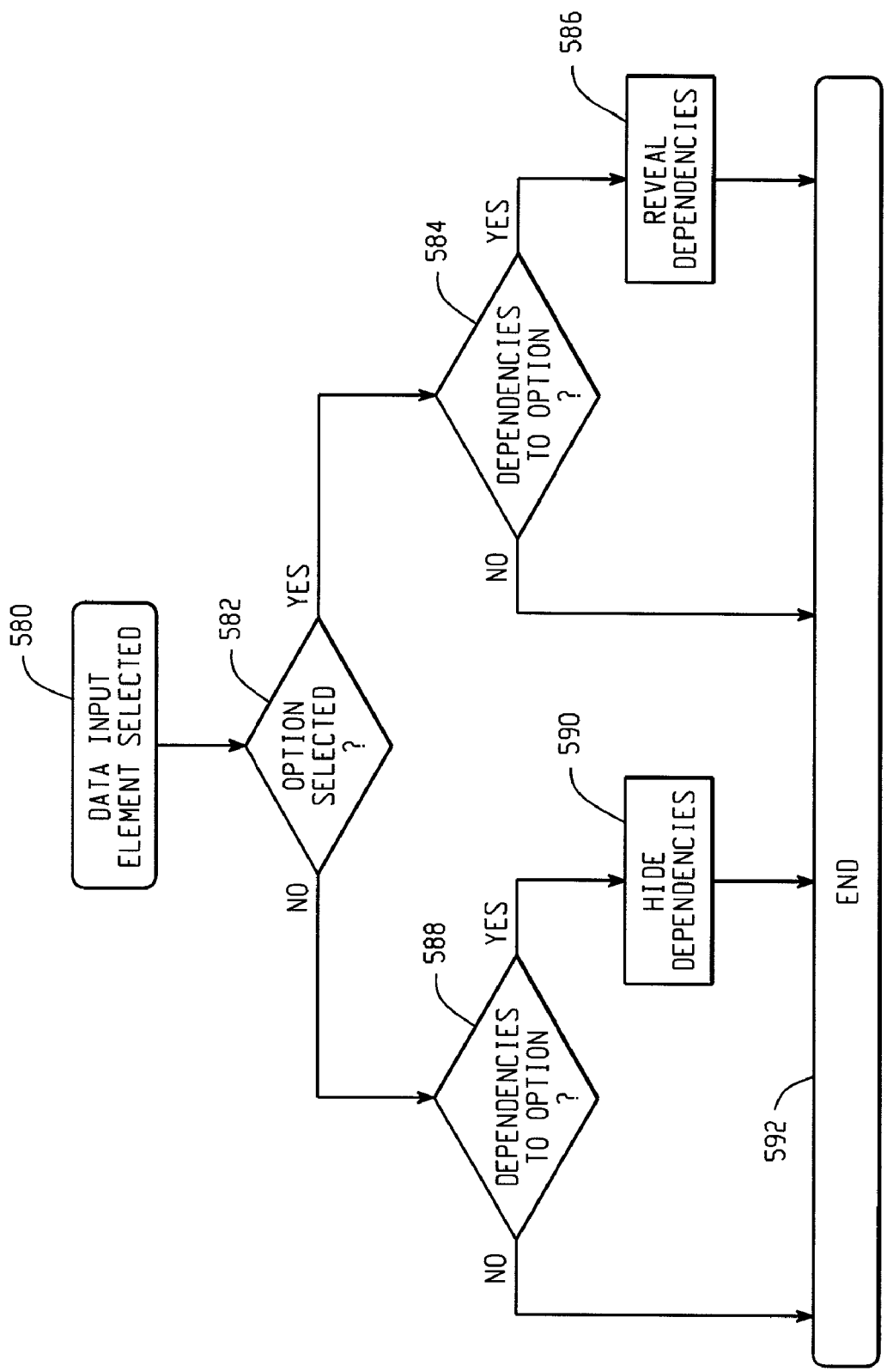
FIG. 15 is a flow chart depicting handling an example dependency situation.

FIG. 15 is a flow chart illustrating handling a dependency situation. At step 580, a user has selected on a form a data input element. Decision step 582 examines whether an option within the data input element has been selected. If it has, then decision step 584 examines whether the selected option has any associated dependency items. If not, then processing at least for this iteration ends at end block 592. However if there are dependencies, then step 586 reveals dependencies before processing ends at end block 592.

With reference back to decision step 582, if an option has not been selected, then processing continues at decision step 588. Decision step 588 allows the hiding of dependencies at step 590 for all options within the data input element that have not been selected. If there are no dependencies, then processing ends at end block 592.

Figure 16:
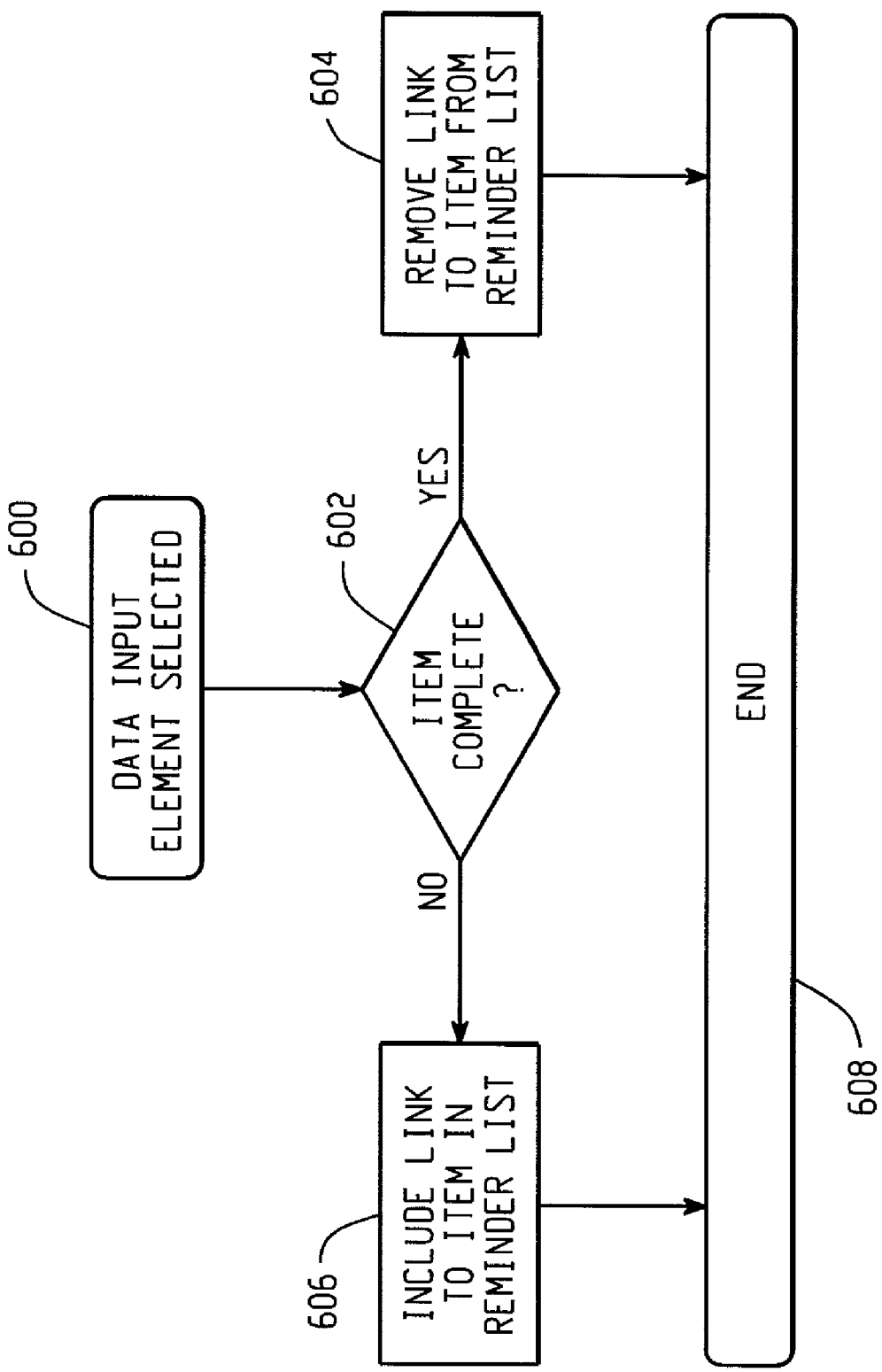
FIG. 16 is a flow chart depicting an example handling of incomplete items on a form.

FIG. 16 is a flow chart illustrating handling incomplete items on a web-based form. At step 600, a user has selected on a form a data input element. Decision step 602 examines whether an item has been completed. If it has, then at step 604 the link to the item is removed from the reminder list. If it has not, then at step 606 the link to the item is included in the reminder list. Processing ends at least for this iteration at end block 608.

Figure 17:
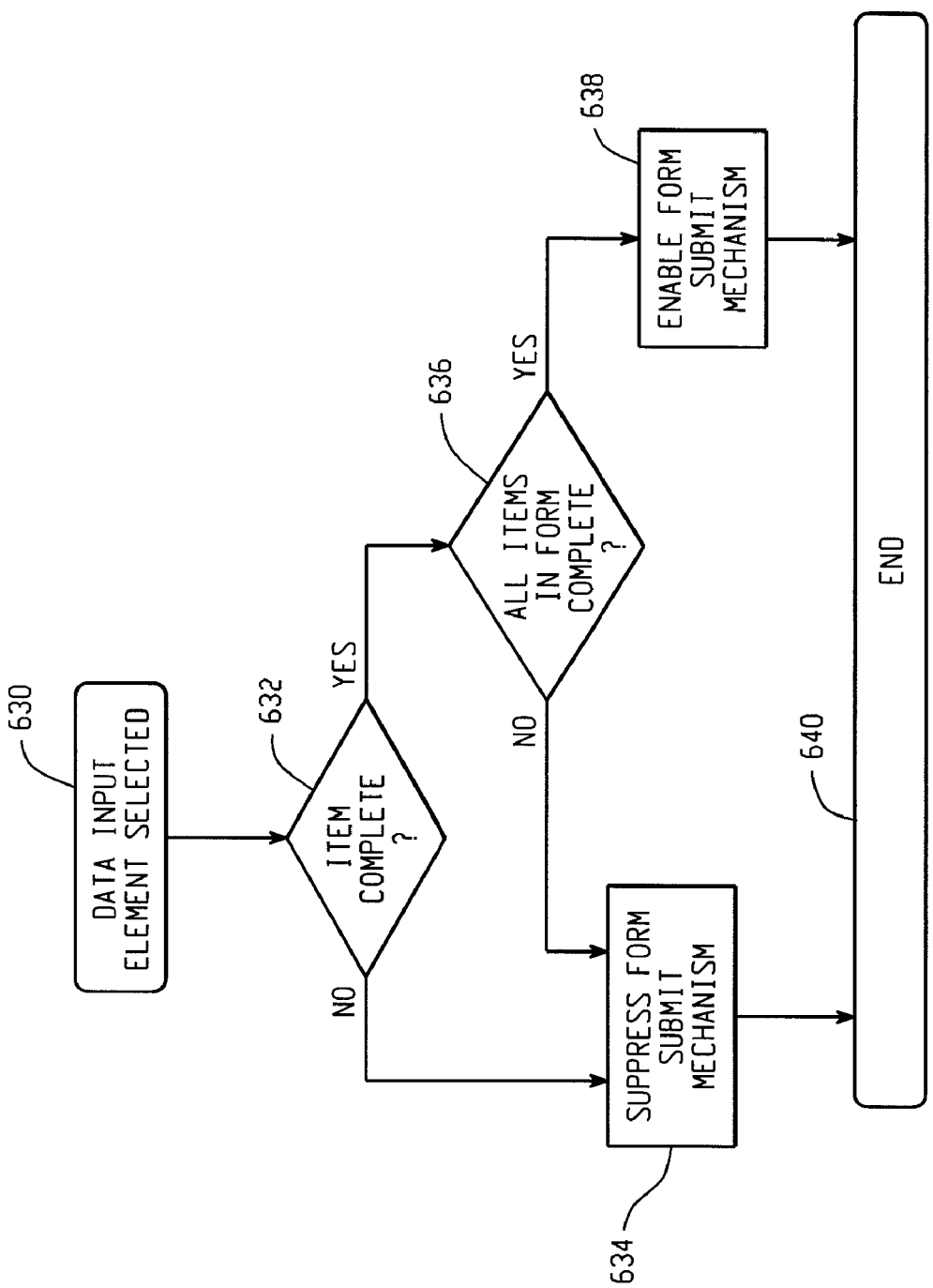
FIG. 17 is a flow chart of an example suppression of form submission until completion.

FIG. 17 is a flow chart illustrating the suppression of submission of a web-based form until completion. At step 630, a user has selected on a form a data input element. Decision step 632 examines whether an item has been completed. If it has not, then step 634 suppresses the form submit mechanism before processing (at least for this iteration) ends at end block 640.

If the item has been completed as determined at decision step 632, then processing continues at decision step 636. If all items in the form have not been completed as determined by decision step 636, then processing continues at step 634. However if all items in the form have been completed, then processing continues at step 638 wherein the form submit mechanism is enabled. Processing ends at end block 640.

Figure 18:
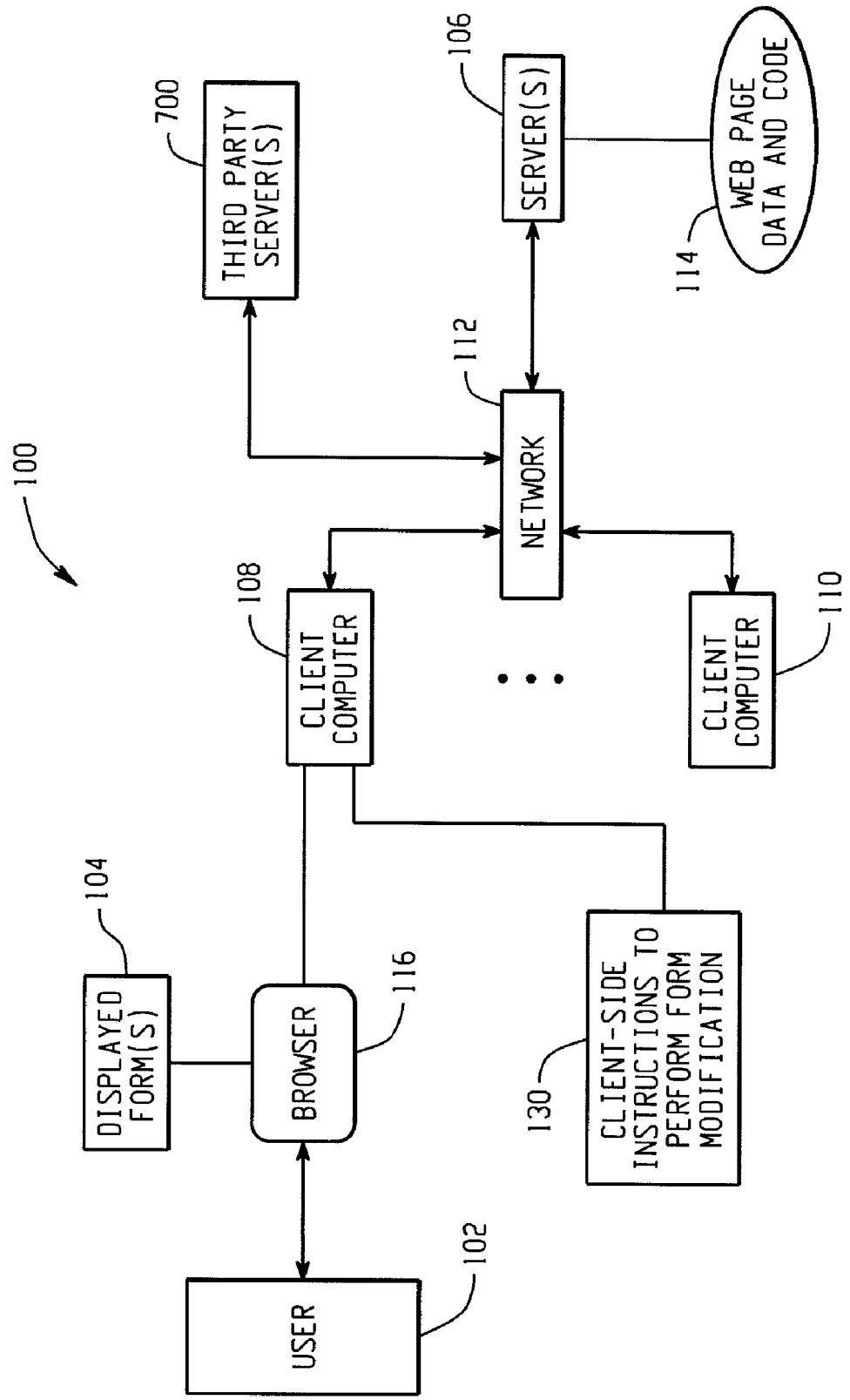
FIG. 18 is a block diagram depicting different sources of client-side instructions for use in handling a form.

While examples have been used to disclose the invention, including the best mode, and also to enable any person skilled in the art to make and use the invention, the patentable scope of the invention is defined by the claims, and may include other examples that occur to those skilled in the art. For example, the client-side instructions 130 may be supplied from different sources. As illustrated in FIG. 18, such sources may include the server system 106 that supplied the web-based form 104, or a third party server system 700 (i.e., a server that did not provide the web page form to the client computer) or the client computer 108 itself. The systems and methods also allow flexibility in interacting with servers. For example, the same or different servers may provide to and accept forms from a client computer.

Still further, the systems and methods disclosed herein allow for cross-browser and cross-version compatibility. This is exemplified in that the systems and methods work under many different types of web browsers, such as Internet Explorer, Netscape Navigator, and Mozilla.

As yet another example of the many applications and extensions of the systems and methods, many implementation environments may be used. The following discussion of a DHTML method of implementation, relying on Javascript, cascading style sheets (CSS), and the W3C's document object model (DOM) illustrates this. It is noted that the same functionality can be achieved using Java applets, ActiveX, Jscript, or other client-side processing technologies.

The items in this example are contained in an HTML DIV tag with a unique ID attribute. The header section of each item is a three-cell table containing a check mark for item completion, the text of the question, and its identifying number. The check mark is initially invisible because its CSS color specification (defined by class chk) matches the background color of its table cell. The HTML structure follows the pattern of the following pseudocode:

```
<div id="id-name">
<table cellspacing="0"><tr>
<td class="chk" id="id-name__chk">√</td>
<td class="txt"><a name="id-name"></a>Question text ...</td>
<td class="num" id="id-name__num">item-number</td>
</tr></table>
<table cellspacing="0"><tr>
<td><input    type="input-type"    name="id-name"    value="value"
        onclick="chk(this)"></td>
<td>Response text ...</td>
</tr>
Additional responses ...
</table>
</div>
``` where:
  item-name is the unique identifier for the item; and
  item-number is the number of the item.

At the bottom of the web page, just before the FORM tag is closed, the submit button is inserted within a DIV identified as submit. By specifying a style sheet attribute of display:none for ID submit, the submit button is suppressed when the page first loads as shown in the following:

```
            <div id="submit">
            <input type="submit" value="Submit">
            </div>
            </form>
```

At the bottom of the page, after the FORM element is closed, the reminder box is inserted within a DIV element identified as map. With respect to the reminder list, Javascript code is used to create a variable named map, which embeds the locations and ID numbers of incomplete items in A HREF and LI tags. The HTML content of map is inserted within the table incomp, between a pair of UL and TD tags. This is shown in the following example:

```
<div id="map">
<script type="text/javascript" language="javascript"><!--
if(document.getElementById){
   var itot=document.getElementById('form').childNodes. length-1;
   var map='';
   for(i=0;i<itot;i++){
      var missid=document.getElementById('form').childNodes(i).id;
      map=map+'<li id=miss_'+missid+'><a href="#'+missid+
         '" onclick="flag(this)">  '+eval(i+1)+
         '  </a></li>';}
```

```
        document.write('<table id="incomp" cellspacing="0"><tr>'+
          '<td class="txt" width="100%">These items must be completed '+
          'in order to submit this form:</td>'+
          '<td><ul>'+map+'</ul></td></tr></table>');}
//--></script>
</div>
```

In this example, when all required items have been completed the reminder box is suppressed due to the style attribute display:none and the submit button is revealed due to display:block.

A series of functions are defined in Javascript for specific tasks, then called by other functions as needed. The function selmark( ) boldfaces the selected option's text by locating the parent node of the input element, then applying a bold weight to the text of the adjacent node, as shown in the following:

```
        function selmark(loc){
          loc.parentNode.nextSibling.style.fontWeight='bold';}
```

The function selclear( ) removes boldface from the table cells containing item responses. It creates an array of the table cells, then steps through each cell and strips the font weight specification, as shown in the following:

```
        function selclear(tab){
          for(i=0;i<tab.rows.length;i++){
            for(j=0;j<tab.rows(i).cells.length;j++){
              tab.rows(i).cells(j).style.fontWeight='';}}}
```

The function chkmark( ) sets the color of the item's completion mark (an italicized radical: √) to green. This renders it visible, since its default color is the same as the cell background. The function also normalizes the color of the item's ID number, in case it was highlighted by use of the reminder box link, as shown in the following:

```
function chkmark(nom){
        document.getElementById(nom+'_chk').style.color='#063';
        document.getElementById(nom+'_num').style.color='#063';}
```

The function chkclear( ) returns the completion mark to its invisible state by removing the color value introduced by the chkmark( ) function. This is used when the item is rendered incomplete by a deselection. The following illustrates this:

```
        function chkclear(nom){
          document.getElementById(nom+'_chk').style.color='';}
```

The function remap( ) updates the reminder box at the bottom of the form. It counts the number of nodes within the FORM element, minus one for the embedded DIV containing the submit button. It then steps through this count, hiding the reminder link for each item whose completion mark has been colorized. If all items have been completed, the reminder box is suppressed and the submit box is revealed, by means of the CSS display attribute. Otherwise, the reminder box remains displayed and the submit box is suppressed. The following illustrates this:

```
function remap( ){
        var itot=document.getElementById('form').childNodes.length-1;
        var imiss=0;
        for(i=1;i<=itot;i++){
          if(document.getElementById('i'+i+'_chk').style.color)
            document.getElementById('miss_i'+i).style.display='none';
          else{
            document.getElementById('miss_i'+i).style.display='block';
            imiss=1;}}
        if(imiss){
          document.getElementById('map').style.display='block';
          document.getElementById('submit').style.display='none';}
        else{
          document.getElementById('map').style.display='none';
          document.getElementById('submit').style.display='block';}}
```

The function chk( ) is invoked by radio and check input boxes, using the attribute and value onclick="chk(this, 'sub')" within the INPUT element. The use of this automatically conveys the name of the INPUT element, which should be the same as the ID name for the parent item. The second variable, sub, specifies the name of the dependent subsection, if one exists. The chk( ) function calls selclear( ) to clear any previous boldface within the question, and then selmark( ) to boldface the current selection. If a subsection is indicated by the presence of sub, the subsection (identified as id-name-_sub-name) is displayed. If the subsection was left incomplete after previous use, the completion mark for the parent question is removed. If the subsection was completed, the parent completion mark is shown. Then the remap( ) function is used to update the reminder box, as shown in the following:.

```
        function chk(loc,sub){
          if(document.getElementById){
            var tab=loc.parentNode.parentNode.parentNode;
            var nom=tab.parentNode.parentNode.id;
            selclear(tab);
            selmark(loc);
            if(sub){
              var subsec=document.getElementById(nom+'_'+sub);
              subsec.style.display='block';
              var subtot=eval(subsec.childNodes.length/2);
              var subcnt=0;
              for(i=1;i<=subtot;i++){
                if(document.getElementById(nom+'_'+sub+'.'+i+'_chk')
                    .style.color!='')
                  subcnt++;}
              if(subcnt!=subtot)
                chkclear(nom);}
              else{
                if(document.getElementById(nom).childNodes.length>2)
                  document.getElementById(nom).childNodes[1]
                    .style.display='none';
                chkmark(nom);}
              remap( );}}
```

The function chksub( ) is invoked by the input boxes of dependent questions, using the attribute and value onclick="chksub(this)" to convey the name of the INPUT element. Subsection INPUT elements use the naming convention id-name_sub-name.num to facilitate tracking. The chksub( ) function relies on selclear( ) to clear any previous boldface within the question, and then uses selmark( ) to boldface the current selection. The current item's completion mark is then colorized. If all subsection check marks are now colorized, the completion mark for the parent item is colorized. Finally, the remap( ) function updates the reminder box, as shown in the following:

```
function chksub(loc){
    var nom=loc.parentNode.parentNode.parentNode.parentNode
        .parentNode.id;
    var tab=loc.parentNode.parentNode.parentNode;
    var subtot=eval(document.getElementById(nom).childNodes.length/2);
    selclear(tab);
    selmark(loc);
    chkmark(loc.name);
    var subcnt=0;
    for(i=1;i<=subtot;i++){
        if(document.getElementById(nom+'.'+i+'_chk').style.color!='')
            subcnt++;}
    if(subcnt==subtot){
        chkmark(document.getElementById(nom).parentNode.id);
        remap( );}}
```

The function sel( ) is used by multi-part pull-down selection groups, such as the month and year selectors shown in FIG. 6. The function sel( ) detects when all items in the group 15 have values greater than zero. When this occurs, the item's completion mark is highlighted. If one or more selectors in the group are returned to zero, the completion mark is suppressed, then the function remap( ) updates the reminder box, as shown in the following:

```
function sel(loc){
    var seltot=loc.parentNode.parentNode.childNodes.length;
    var selmiss=0;
    for(i=0;i<seltot;i++){
        var selid=loc.parentNode.parentNode.childNodes[i].id;
        if(document.getElementById('form').elements[selid]
            .selectedIndex==0)
            selmiss=1;}
    var nom=selid.substr(0,selid.indexOf('_'));
    selmiss==0?chkmark(nom):chkclear(nom);
    remap( );}
```

The function flag( ) is used as part of the reminder box, triggered by an onclick event within a listed A HREF link: onclick="flag(this)". The function appends_num to the ID value conveyed by this, in order to target the table cell corresponding to the item's display number. It then highlights the ID number in the item's header to aid identification, as shown in the following:

```
function flag(loc){
    var ref=loc.parentNode.id;
    document.getElementById(ref.substr(ref.lastIndexOf('_')+1)+'_num')
        .style.color='#903';}
```

The systems and methods disclosed herein are applicable to more than web-based forms, but include computer-implemented forms that are obtained from a server or other remote computer for use on another computer. Also, while radio button lists of options have been used as examples herein, it should be understood that the systems and methods may be used with any list on a form that provides one or more options to a user for selection (e.g., check boxes, pull-down option items, etc.).

It is further noted that the data of the systems and methods disclosed herein may be stored as one or more data structures in computer memory depending upon the application at hand. The systems and methods may be provided on many different types of computer readable media including instructions being executable by a computer to perform the system and method operations described herein. Different types of client computers can use the systems and methods, such as personal computers, laptops, personal digital assistants, wireless communication devices, etc.

The computer components, software modules, functions and data structures described herein may be connected directly or indirectly to each other in order to allow the flow of data needed for their operations. It is also noted that a software module may include but is not limited to being implemented as one or more sub-modules which may be located on the same or different computer. A module may be a unit of code that performs a software operation, and can be implemented for example as a subroutine unit of code, or as a software function unit of code, or as an object (as in an object-oriented paradigm), or as an applet, or in a computer script language, or as another type of computer code.

It is claimed as the invention:

1. A computer-implemented system for use in collecting data from a user, comprising:
   a client computer configured to connect to a network to obtain over the network form-related data from a server computer system;
   wherein a form is displayed based upon the form-related data in a user interface that is generated by the client computer, wherein the form is to collect data from a user;
   client-side computer instructions executable on the client computer that visually modifies the form in response to data collected from the user through the form;
   wherein the client-side computer instructions are configured to highlight a selection made by the user upon a data item contained within the form, wherein the client-side instructions are configured to highlight the selection in response to the user selecting the data item;
   wherein the client-side computer instructions are configured to provide a visual indication that a data item is complete after the user has provided information required by the data item;
   wherein the client-side instructions are configured to provide a list of currently incomplete data items to the user;
   wherein the list is updated as the user completes a data item contained on the form;
   wherein a data item provided in the list is associated with a link, wherein the link provides access to the data item so that the user can view the data item associated with the link.

2. The system of claim 1, wherein the data item provides a list of options from which the user can select.

3. The system of claim 2, wherein the selection of an option provided in the list is highlighted by at least substantially boldfacing the selection.

4. The system of claim 2, wherein the selection of an option provided in the list is highlighted by colorizing the selection differently from the other options provided in the data item.

5. The system of claim 1, wherein the client-side computer instructions generate data indicative of the degree of completion for the data item, wherein the degree of completion is based upon user input with respect to the data item.

6. The system of claim 5, wherein the client-side computer instructions generate a visual indicator for indicating the degree of completion for the data item.

7. The system of claim 6, wherein the visual indicator is a check mark indicator placed in the data item's header.

8. The system of claim 7, wherein the visual indicator provides a differentiation between the completed data item and data items not completed by the user.

9. The system of claim 8, wherein deselection of the data item by the user removes the visual indicator from the data item's header.

10. The system of claim 1, wherein the data item contains a multi-part question, wherein the client-side computer instructions are configured to add a visual completion indicator to the data item after the user has provided all required input to the parts of the multi-part question.

11. The system of claim 1, wherein the data item contains an option which has one or more dependent questions, wherein the client-side computer instructions are configured to add a visual completion indicator to the form to indicate when the user has supplied a response to a dependent question.

12. The system of claim 11, wherein the client-side computer instructions are configured to provide a visual completion indicator to the option after the user has provided all required input to the option's dependent questions.

13. The system of claim 12, wherein deselection with respect to a dependent question removes a visual completion indicator from the dependent question.

14. The system of claim 13, wherein deselection with respect to a dependent question removes a visual completion indicator from the data item.

15. The system of claim 14, wherein the visual completion indicator is a check mark.

16. The system of claim 1, wherein the client-side computer instructions generate data indicative of the degree of completion for the form, wherein the degree of completion is based upon user input with respect to data items provided on the form.

17. The system of claim 1, wherein the degree of completion is expressed as a completion percentage.

18. The system of claim 1, wherein the client-side instructions prevent submission of the form while the form is incomplete.

19. The system of claim 18, wherein the form submit button is inactive until the form is completed.

20. The system of claim 1, wherein the server computer system handles a request for web page content received over the network from the client computer.

21. The system of claim 1, wherein the network is selected from the group consisting of an intranet network, Internet network, local area network, wide area network, wireless network, network accessible via modems, and combinations thereof.

22. The system of claim 1, wherein the form is a web-based form.

23. The system of claim 1, wherein the web-based form includes a plurality of data items, wherein each data item provides a list of options from which the user can select.

24. The system of claim 1, wherein multiple screen displays are required to display the web-based through a web browser.

25. The system of claim 1, wherein a next screen indicator is required to be activated in order to see a succeeding page of the web-based form.

26. The system of claim 1, wherein the client-side computer instructions visually modify the form with respect to the data item substantially in real-time based upon user input to the data item.

27. The system of claim 1, wherein the client-side computer instructions visually modify the form with respect to the data item in near-real time based upon user input to the data item.

28. The system of claim 1, wherein the client-side computer instructions perform a validation operation based upon the user input to the data item, wherein the validation operation is performed before data acquired through the form is sent from the client computer to a server.

29. The system of claim 28, wherein the server is the server which sent the form-related data to the client computer.

30. The system of claim 28, wherein the server is a server which did not send the form-related data to the client computer.

31. The system of claim 1, wherein the data item is a radio button-based data item.

32. The system of claim 1, wherein the data item is a check box-based data item.

33. The system of claim 1, wherein the data item is a pull down-based data item.

34. A computer-implemented method for operation on a client computer and for use in collecting data from a user, wherein the client computer is configured to connect to a network to obtain over the network form-related data from a server computer system, said method comprising:
    executing client-side instructions to display a form on the client computer based upon the form-related data in a user interface that is generated by the client computer, wherein the form is to collect data from a user;
    executing the client-side computer instructions to visually modify the form in response to data collected from the user through the form;
    executing the client-side computer instructions to highlight a selection made by the user upon a data item contained within the form, wherein the client-side instructions are configured to highlight the selection in response to the user selecting the data item;
    executing the client-side computer instructions to provide a visual indication that a data item is complete after the user has provided information required by the data item;
    executing the client-side instructions to provide a list of currently incomplete data items to the user;
    wherein the list is updated as the user completes a data item contained on the form;
    wherein a data item provided in the list is associated with a link, wherein the link provides access to the data item so that the user can view the data item associated with the link.

35. Computer-readable storage medium or mediums encoded with client-side instructions that cause a client computer to perform a method for use in collecting data from a user, wherein the client computer is configured to connect to a network to obtain over the network form-related data from a server computer system, said method comprising:
    executing client-side instructions to display a form on the client computer based upon the form-related data in a user interface that is generated by the client computer, wherein the form is to collect data from a user;
    executing the client-side computer instructions to visually modify the form in response to data collected from the user through the form;
    executing the client-side computer instructions to highlight a selection made by the user upon a data item contained within the form, wherein the client-side instructions are configured to highlight the selection in response to the user selecting the data item;
    executing the client-side computer instructions to provide a visual indication that a data item is complete after the user has provided information required by the data item;
    executing the client-side instructions to provide a list of currently incomplete data items to the user;
    wherein the list is updated as the user completes a data item contained on the form;

wherein a data item provided in the list is associated with a link, wherein the link provides access to the data item so that the user can view the data item associated with the link.

36. A computer-implemented system for use in collecting data from a user, comprising:
a client computer configured to connect to a network to obtain over the network form-related data from a server computer system;
wherein a form is displayed based upon the form-related data in a user interface that is generated by the client computer, wherein the form is to collect data from a user;
client-side computer instructions executable on the client computer that visually modifies the form in response to data collected from the user through the form;
wherein the client-side computer instructions are configured to highlight a selection made by the user upon a data item contained within the form, wherein the client-side instructions are configured to highlight the selection in response to the user selecting the data item;
wherein the client-side computer instructions are configured to provide a visual indication that a data item is complete after the user has provided information required by the data item;
wherein the client-side instructions are configured to provide a list of currently incomplete data items to the user;
wherein the list is updated as the user completes a data item contained on the form;
wherein the list is updated if the user removes a response to a data item contained on the form.

37. The system of claim 36, wherein the data item provides a list of options from which the user can select.

38. The system of claim 37, wherein the selection of an option provided in the list is highlighted by at least substantially boldfacing the selection.

39. The system of claim 37, wherein the selection of an option provided in the list is highlighted by colorizing the selection differently from the other options provided in the data item.

40. The system of claim 36, wherein the client-side computer instructions generate data indicative of the degree of completion for the data item, wherein the degree of completion is based upon user input with respect to the data item.

41. The system of claim 40, wherein the client-side computer instructions generate a visual indicator for indicating the degree of completion for the data item.

42. The system of claim 41, wherein the visual indicator is a check mark indicator placed in the data item's header.

43. The system of claim 42, wherein the visual indicator provides a differentiation between the completed data item and data items not completed by the user.

44. The system of claim 43, wherein deselection of the data item by the user removes the visual indicator from the data item's header.

45. The system of claim 36, wherein the data item contains a multi-part question, wherein the client-side computer instructions are configured to add a visual completion indicator to the data item after the user has provided all required input to the parts of the multi-part question.

46. The system of claim 36, wherein the data item contains an option which has one or more dependent questions, wherein the client-side computer instructions are configured to add a visual completion indicator to the form to indicate when the user has supplied a response to a dependent question.

47. The system of claim 46, wherein the client-side computer instructions are configured to provide a visual completion indicator to the option after the user has provided all required input to the option's dependent questions.

48. The system of claim 47, wherein deselection with respect to a dependent question removes a visual completion indicator from the dependent question.

49. The system of claim 48, wherein deselection with respect to a dependent question removes a visual completion indicator from the data item.

50. The system of claim 49, wherein the visual completion indicator is a check mark.

51. The system of claim 36, wherein the client-side computer instructions generate data indicative of the degree of completion for the form, wherein the degree of completion is based upon user input with respect to data items provided on the form.

52. The system of claim 36, wherein the degree of completion is expressed as a completion percentage.

53. The system of claim 36, wherein the client-side instructions prevent submission of the form while the form is incomplete.

54. The system of claim 53, wherein the form submit button is inactive until the form is completed.

55. The system of claim 36, wherein the server computer system handles a request for web page content received over the network from the client computer.

56. The system of claim 36, wherein the network is selected from the group consisting of an intranet network, Internet network, local area network, wide area network, wireless network, network accessible via modems, and combinations thereof.

57. The system of claim 36, wherein the form is a web-based form.

58. The system of claim 36, wherein the web-based form includes a plurality of data items, wherein each data item provides a list of options from which the user can select.

59. The system of claim 36, wherein multiple screen displays are required to display the web-based through a web browser.

60. The system of claim 36, wherein a next screen indicator is required to be activated in order to see a succeeding page of the web-based form.

61. The system of claim 36, wherein the client-side computer instructions visually modify the form with respect to the data item substantially in real-time based upon user input to the data item.

62. The system of claim 36, wherein the client-side computer instructions visually modify the form with respect to the data item in near-real time based upon user input to the data item.

63. The system of claim 36, wherein the client-side computer instructions perform a validation operation based upon the user input to the data item, wherein the validation operation is performed before data acquired through the form is sent from the client computer to a server.

64. The system of claim 63, wherein the server is the server which sent the form-related data to the client computer.

65. The system of claim 63, wherein the server is a server which did not send the form-related data to the client computer.

66. The system of claim 36, wherein the data item is a radio button-based data item.

67. The system of claim 36, wherein the data item is a check box-based data item.

68. The system of claim 36, wherein the data item is a pull down-based data item.

69. A computer-implemented method for operation on a client computer and for use in collecting data from a user, wherein the client computer is configured to connect to a network to obtain over the network form-related data from a server computer system, said method comprising:

executing client-side instructions to display a form on the client computer based upon the form-related data in a user interface that is generated by the client computer, wherein the form is to collect data from a user;

executing the client-side computer instructions to visually modify the form in response to data collected from the user through the form;

executing the client-side computer instructions to highlight a selection made by the user upon a data item contained within the form, wherein the client-side instructions are configured to highlight the selection in response to the user selecting the data item;

executing the client-side computer instructions to provide a visual indication that a data item is complete after the user has provided information required by the data item;

executing the client-side instructions to provide a list of currently incomplete data items to the user;

wherein the list is updated as the user completes a data item contained on the form;

wherein the list is updated if the user removes a response to a data item contained on the form.

70. Computer-readable storage medium or mediums encoded with client-side instructions that cause a client computer to perform a method for use in collecting data from a user, wherein the client computer is configured to connect to a network to obtain over the network form-related data from a server computer system, said method comprising:

executing client-side instructions to display a form on the client computer based upon the form-related data in a user interface that is generated by the client computer, wherein the form is to collect data from a user;

executing the client-side computer instructions to visually modify the form in response to data collected from the user through the form;

executing the client-side computer instructions to highlight a selection made by the user upon a data item contained within the form, wherein the client-side instructions are configured to highlight the selection in response to the user selecting the data item;

executing the client-side computer instructions to provide a visual indication that a data item is complete after the user has provided information required by the data item;

executing the client-side instructions to provide a list of currently incomplete data items to the user;

wherein the list is updated as the user completes a data item contained on the form;

wherein the list is updated if the user removes a response to a data item contained on the form.

\* \* \* \* \*